June 17, 1930.  E. TYDEN  1,763,834
SPRINKLER SYSTEM MAIN VALVE
Filed Oct. 7, 1927   2 Sheets-Sheet 1
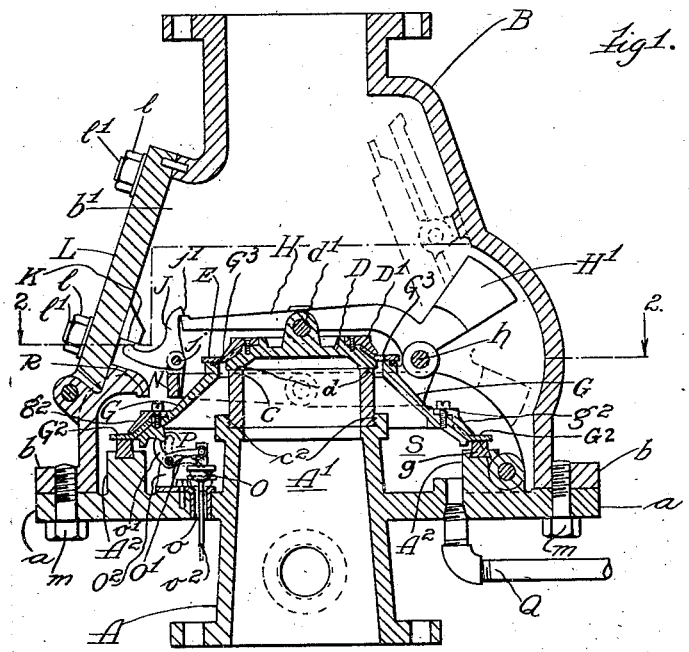
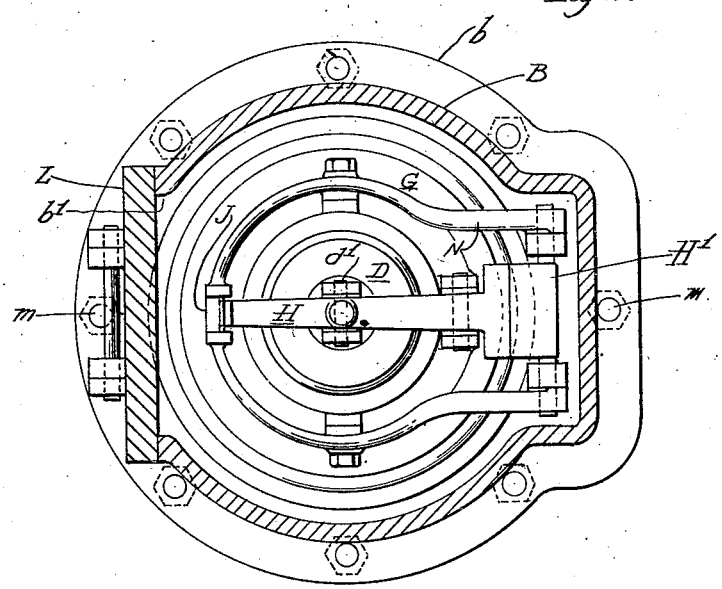
Inventor.
Emil Tyden.

June 17, 1930.  E. TYDEN  1,763,834

SPRINKLER SYSTEM MAIN VALVE

Filed Oct. 7, 1927  2 Sheets-Sheet 2

Inventor.
Emil Tyden.
by Burton & Burton
his Attorneys.

Patented June 17, 1930

1,763,834

UNITED STATES PATENT OFFICE

EMIL TYDEN, OF EVANSTON, ILLINOIS

SPRINKLER-SYSTEM MAIN VALVE

Application filed October 7, 1927. Serial No. 224,536.

The purpose of this invention is to provide an improved construction in the main valve of a fire extinguishing sprinkler system adapted to afford a relatively large area for the action of the air pressure of the system in comparison with the area of the water controlling valve which is exposed to the water pressure, in accordance with the familiar principle of this type of devices, while at the same time enabling the employment of a relatively small water inlet port and valve for controlling the port, so that with a valve body of a size to accommodate an air valve of given area the ratio of that area to the area of the water-controlling valve may be larger than has been possible in certain common types of such devices.

Another purpose of the invention is to obviate in the opening and closing movement of the main valve, the necessity for any substantial movement of the part or element of that valve which controls the area exposed to sub-atmospheric air pressure of the system in excess of the area exposed to the water pressure, said opening and closing movement being substantially limited to the element of the valve mechanism which controls the water inlet.

Another purpose of the invention is to ensure the operation of the connections for sounding an alarm upon a predetermined minimum opening of the main valve admitting water to the system, and to accomplish this consistently with the other purposes of the invention. The invention consists in the elements and features of construction shown and described as indicated in the claims.

In the drawings:

Figure 1 is a vertical axial section of one form of a sprinkler system main valve embodying this invention.

Figure 2 is a plan view of the construction shown in Figure 1 with the upper casing member removed showing the operating parts assembled on the lower member of the main valve body.

Figure 3:
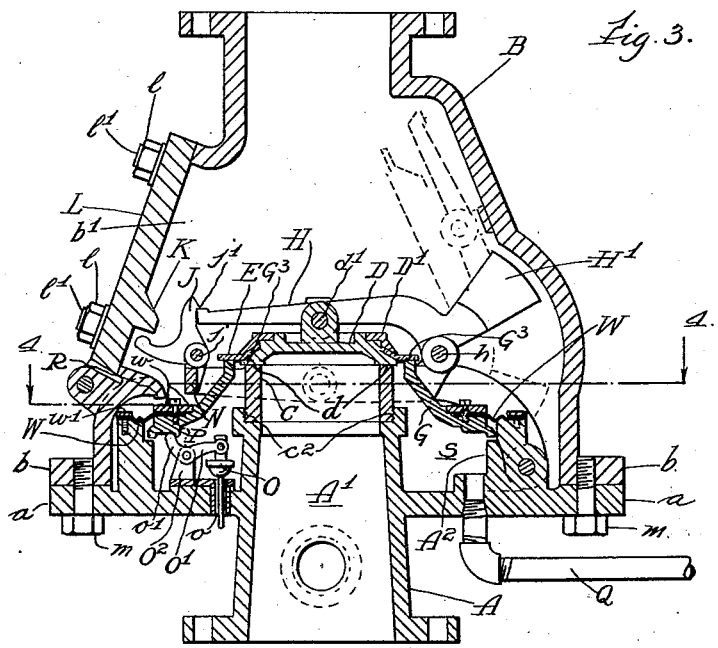
Figure 3 is a similar view showing a modification of the invention.

In the construction shown in Figure 1, the main valve body comprises a member, A, having formed integrally with it the water inlet pipe terminal, $A^1$, adapted to carry all the operating parts of the structure, and a co-operating casing member, B, which is adapted to be applied vertically upon the member, A, encompassing all the operating parts which have been assembled on the member, A, the members, A and B, terminating in peripheral flanges, $a$ and $b$, respectively, which are adapted to be clamped together by bolts, $m$, as shown, their mating faces being flat in a plane directly transverse to the axes of both members so that they are readily machined and ground,—together if necessary,—for making the junction between them watertight without intervening packing. The casing member, B, has a hand hole indicated at $b^1$, which is closed by a hinged cover, L, and secured in closed position by nuts, 1, engaging threaded studs, $l^1$. The water inlet pipe member, $A^1$, is terminated by a valve seat member, C, screwed into the upper end of said inlet pipe member, $A^1$, as seen at $c^2$, bounding the water inlet port, $A^1$. This construction is adopted to facilitate the removal of the seating member, C, for re-dressing, avoiding the necessity of performing the re-dressing process by operating through the hand hole, which is a very difficult process, and one which it is very nearly impossible to perform satisfactorily in respect to the accuracy of finish given to the seat. The main valve, D, is dimensioned for easy insertion and removal through the hand hole, $b^1$, so that it can be readily removed for re-dressing the seating face, $d$. This main valve is carried by being suspended pivotally at $d^1$ from an operating lever, H, supported by being fulcrumed as seen at $h$ on an annular valve member, O, hereinafter described. This main valve operating lever, H, is formed with a counterbalancing weighted arm, $H^1$, extending at an angle of something more than 90° to the main arm from which the main valve is suspended, as stated, the weight of said counterbalancing arm, $H^1$, being designed to overbalance both the main arm, H, and the valve suspended therefrom, so that upon relief of the system air pressure which normally operates for holding the main valve seated, and in the absence of water pressure, the main valve when released by the latch, hereinafter described, will be opened by gravity to the position shown in dotted line in Figure 1.

Around the water inlet pipe, $A^1$, there is provided an atmospheric pressure chamber, S, defined between the water inlet pipe member, $A^1$, and an annular boss, $A^2$, concentric with said pipe and encompassing the same at a substantial distance. This atmospheric pressure chamber has the customary atmosphere inlet at the bottom, as seen at $o$, controlled by a valve, O, carried by a lever, $O^1$, fulcrumed on a bracket, $O^2$, mounted on the bottom of the atmospheric pressure chamber and conveniently formed as shown integrally with the lining of the port, $o$, which forms the seat for the valve, O. The atmospheric pressure chamber also has the customary water pipe connection for the alarm valve shown at Q. The atmospheric pressure chamber is closed at the top by an annular element which has the character and function in part which is sometimes referred to as the air valve of a dry pipe valve construction, that is to say, the valve element which affords the excess area for the air pressure of the system above the area presented by the main valve to the water supply pressure. In the construction shown, this annular element, G, spans the interval between the circumscribing wall, $A^2$, of the atmospheric pressure chamber and the periphery of the main valve, D; and for fluid-tight junction at the limit of the interval which it spans, the main valve, D, is provided with a flexible lip, E, of rubber, leather, or the like, adapted to form an accommodating seat, this lip being clamped to the main valve, as seen in Figure 1, by a clamping ring, $D^1$; and at the other limit the element, G, is provided with a similar lip member, $G^2$, clamped to the outer margin of said element, G, by a clamping ring, $g^2$. The lip, E, is adapted to seat upon the upper edge of the annular element, G, and the circumscribing wall, $A^2$, of the atmospheric pressure chamber is provided with a seat member, $g$, upon which the lip, $G^2$, seats in the normal position of the parts when the system is charged with compressed air in condition for performing the function of admitting water when the air pressure is vented by the opening of a sprinkler head due to fire. The annular element, G, is carried by a lever, N, fulcrumed on the member, A, outside the atmospheric pressure chamber, said lever being forked to span said annular element, G, which is pivoted to the fork arms at opposite sides of the water inlet pipe and specifically at opposite sides of the seating member, C, thereof.

The two levers, H and N, which carry respectively the main valve, D, and the annular element, G, are arranged to be locked together when the apparatus is set for service, by means of a latch member, J, pivoted at $j$ on the lever, N, and having its catch nose, $j^1$, engaging the end of the lever, H, remote from its fulcrum, that is, at the opposite side of the pivotal connection of the main valve, D, with said lever. The atmosphere inlet and controlling valve, O, for the atmospheric pressure chamber is held normally at open position by means of a lug, P, which projects from the inner side of the annular element, G, in position for engaging the tail, $o^1$, of the lever, $O^1$. It will be understood that when released from the detention effected by the lug, P, the valve, O, tends to seat by gravity, and in the seating movement the tail, $o^1$, of the lever, $O^1$, moves to position shown in dotted line in Figure 1, at which position the lug, P, becomes engaged behind said tail, $o^1$, thereby locking the valve in closed position as in the first instance it was locked in open position by said lug, P. The purpose of this construction will hereinafter appear.

The casing member, B, has projecting inward from the lower margin of the hand hole cover, $b^1$, a lug, R, which overhangs the clamping ring, $g^2$, which secures the seating lip, $G^2$, to said annular member, G, said lug being spaced from the upper surface of said ring by a short distance, which, as will hereinafter appear, becomes the measure and limit of the movement which the annular member, G, can receive from its carrying lever, N, if and whenever that lever is operated by its connection through the latch, J, with the main valve lever, H.

The operation of the construction as thus far described may be understood to be as follows:

The parts being assembled and related as shown in Figure 1, that is to say, the valve, D, being seated at the water inlet port through the seating member, C, the annular member, G, being in contact at its inner and outer circumferences with the adjacent parts for closing the atmospheric pressure chamber,— that is to say, the lip, $G^2$, being in contact with the seat, $g$, and the lip, E, of the main valve being in contact with the upper seat, $G^3$, of the member, G, the latch having its nose, $j^1$, engaged with the end of the lever, H, and the hand hole being closed, water pressure being operative through the water inlet pipe member, $A^1$, upon the under side of the main valve and said main valve and the annular element, G, being exposed to the superatmospheric air pressure of the system,—if by reason of pulsation in the water supply pressure or other cause, the main valve, D, is slightly opened, and water is admitted to the atmospheric pressure chamber, (sometimes called the interseat chamber) if the admission of water exceeds a predetermined minimum, it is the purpose of the construction to ensure that the main valve shall be completely opened, to the end that there shall not occur by the repetition of these slight openings and admission of water in small installments, the eventual accumulation above the main valve of sufficient water to hold the main valve seated by the weight of the water independently of the air pressure of the system, from which if it should occur, there would result incapacity of the structure to operate for fire extinguishment when by the opening of the sprinkler head the air pressure might be vented, because in that event the water pressure would continue to hold the main valve seated as if no venting of the air pressure had occurred. The construction described accomplished this purpose.

The limited opening movement of the valve, D, by the engagement of the lever, H, with the latch, J, operates the lever, N, causing it to carry the annular member, G, into seated relation with the lip, E; and if the movement continues beyond the predetermined degree, the tail, $j$, of the latch, J, encountering the abutment, K, on the hand hole cover causes the disengagement of the latch from the lever, H, which leaves the valve, D, free to spring to wide open position under the action of the water pressure below it, opposed only by the super-atmospheric pressure above it over but slightly increased area, the annular member, G, exposed to the super-atmospheric pressure of the system operating over a slightly greater area than that exposed to the water pressure. For it will be noted that said air pressure being, according to the common practice, less in degree than the water pressure and operates for holding the valve closed in the common constructions only by virtue of operating over the excess area of the air valve corresponding to the annular element, G, of the present construction; and this annular element being now detached from the main valve, D, its area and the pressure thereon is no longer available for holding the main valve seated. Upon the limited opening of the main valve in the manner described, before disengagement of the latch, J, from the lever, H, the annular element, G, is lifted, as mentioned, with the main valve, and the distance to which it is thus lifted before the latch becomes disengaged is sufficient to disengage the lug, P, of the tail, $o^1$, of the lever, $O^1$, whereupon the valve, O, becomes immediately seated so that the atmospheric pressure chamber is no longer open to atmosphere (assuming that the water connection from the alarm valve port, Q, is properly connected with the alarm). When, therefore, the main valve, D, is fully opened in the manner above described, the water pressure from the main water supply pipe becomes operative in the atmospheric pressure chamber and therefrom through the water pipe connection to the alarm for causing the latter to be sounded. And immediately upon the access of the water pressure to the system, it becomes operative upon the upper side of the annular member, G, ensuring that the latter returns to its original position, and in such return the lug, P, becomes engaged behind the tail, $o^1$, of the lever $O^1$, and thereby locks the valve, O, in closed position, ensuring that the pressure will be maintained on the alarm pipe and that no waste of water will occur through the atmosphere port, $o$.

For restoring the system to operative condition when the water has been drained from the system in the customary manner, the hand hole, $b^1$, being open, the operator will first, reaching in through the hand hole engaging the lever, N, lift the annular member, G, sufficiently to disengage the lug, P, of the tail, $o^1$, of the lever, $O^1$, and reaching under the member, A, will thrust up the lever, O, from its seat by means of the stem, $o^2$, of said lever which extends down through the port, $o$, for that purpose, and will then release the lever, N, permitting the annular member, G, to drop to the position at which the lug, P, engages the tail, $o^1$, of the lever, $O^1$, for holding the valve, O, at open position. The operator will next seat the valve, D, by hand and engage the lever, H, with the latch, J, thereby restoring all the parts to their normal position. The hand hole will then be closed and the structure will be in position for applying the air pressure and admitting the water pressure.

Figure 4:
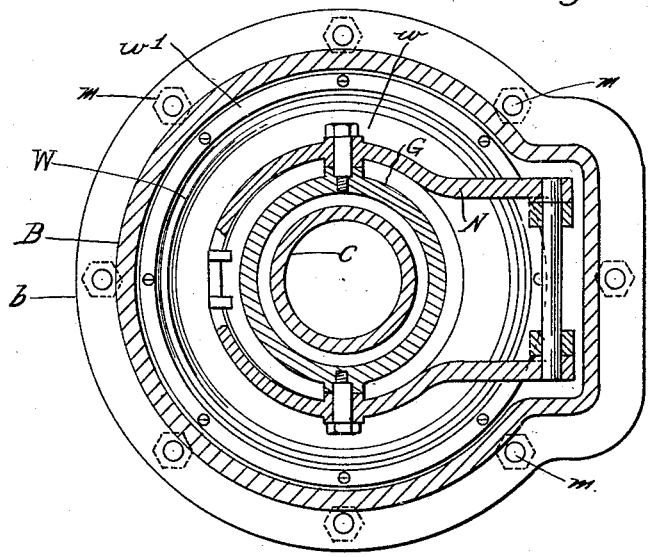
Figure 4 is a view similar to Figure 2 of the construction shown in Figure 3.

In the construction shown in Figures 3 and 4, instead of the provision for merely seating the annular element at the outer circumference on the circumscribing wall of the atmospheric pressure chamber, provision is made for permanent junction between the two elements which is effected by a flexible and radially extensible and collapsible annulus, W, which is clamped at the inner and outer circumferential margins respectively to the outer circumferential margin of the element, G, and to the circumscribing wall of the atmospheric pressure chamber, the clamping being effected by clamping rings, $w$—$w^1$.

I claim:

1. In a valve structure for a fire extinguishing sprinkler system, in combination, a main valve body having a main water inlet port and a valve seat thereat; an atmospheric pressure chamber encompassing said inlet port and valve seat; a main valve seating at the main water inlet port; an annular element dimensioned for spanning said atmospheric pressure chamber from the outer bounding wall thereof to the periphery of the main valve; a latch connecting parts moving with the main valve and the annular element respectively for movement of said parts together in a predetermined initial opening movement of the main valve, and means for releasing said latch upon completion of said predetermined initial movement.

2. In a valve structure for a fire extinguishing sprinkler system, in combination, a main valve body having a main water inlet port and a valve seat thereat; an atmospheric pressure chamber encompassing said inlet port and valve seat; a main valve seating at the main water inlet port; an annular element dimensioned for spanning the atmospheric pressure chamber from its outer encompassing wall to the periphery of the main valve; separate operating levers fulcrumed respectively on the main valve body and on said annular element for carrying said parts in an initial opening movement of the main valve; a latch connecting the main valve lever and the annular-element-operating lever, the main valve body having an abutment which is encountered by said latch in the initial opening movement of the main valve, for releasing the latch to disconnect said levers upon predetermined opening movement of the main valve.

3. In a valve structure for a fire extinguishing sprinkler system, in combination, a main valve body having a main water inlet port and a valve seat thereat; an atmospheric pressure chamber encompassing said inlet port and valve seat and having an encompassing wall terminating in an annular seating area; a main valve seating at the main water inlet port and having an annular marginal portion overhanging the atmospheric pressure chamber; an annular element dimensioned for spanning said atmospheric pressure chamber from the seating area of said encompassing wall to said overhanging margin and adapted at its outer and inner circumferential margins respectively to seat at said seating area and overhanging margin; a latch connecting parts moving with the main valve and the annular element respectively for movement of said parts together in a predetermined initial opening movement of the main valve, and means for releasing said latch upon completion of said predetermined initial movement.

4. In a valve structure for a fire extinguishing sprinkler system, in combination, a main valve body having a main water inlet port and a valve seat thereat; an atmospheric pressure chamber encompassing said inlet port and valve seat and having an encompassing wall terminating in an annular seating area, a main valve seating at the main water inlet port and having an annular portion overhanging the atmospheric pressure chamber; an annular element dimensioned for spanning the atmospheric pressure chamber to the periphery of the main valve from the seating area of said encompassing wall to said overhanging margin of the main valve and adapted at its outer and inner circumferential margins respectively to seat at said seating area and overhanging margin; separate operating levers fulcrumed respectively on the main valve body and on said annular element for carrying said parts in initial opening movement of the main valve, a latch connecting the main valve lever and the annular element operating lever, the main valve body having an abutment which is encountered by said latch in the initial opening movement of the main valve for releasing the latch to disconnect said levers upon predetermined opening movement of the main valve.

5. In the construction defined in claim 1, the latch being pivotally mounted on a part moving with the annular element and adapted to engage the part moving with the main valve, the main valve body having an abutment positioned for encounter with the latch in the direction for disengaging it upon a predetermined movement of said parts in the direction of the opening movement of the main valve.

6. In the construction defined in claim 2, the latch being pivoted upon the annular element operating lever and engaging the main valve operating lever and having an arm positioned for encountering the main valve body in the direction for disengaging the latch upon a predetermined opening movement of the main valve.

7. In the construction defined in claim 1, the main valve body having an abutment positioned for encounter of the annular element upon its movement with and in the direction of said predetermined movement of the main valve.

8. In the construction defined in claim 1, said annular element being radially reduceable and extensible, and having its outer circumferential margin secured at the seating area of the encompassing wall of the atmospheric pressure chamber.

9. In the construction defined in claim 1, a lever for carrying the main valve fulcrumed at one side of the main valve port, the main valve being pivotally suspended from said lever over the port, said lever being weighted at the opposite side of its fulcrum from the pivotal connection of the main valve thereto for overbalancing the construction comprising said lever and main valve in the direction for opening the main valve by gravity when the fluid pressures at opposite sides of the valve are balanced.

10. In the construction defined in claim 1, the atmospheric pressure chamber having an alarm valve water connection from its lower part and an atmospheric inlet port, a gravity seating valve controlling said port, and a lever carrying the same mounted in said chamber, the annular element having means engaging the last mentioned valve-carrying lever for locking the same at open position when the annular member is at the position at which it is held when the main valve is seated, said means adapted to release the atmosphere valve lever upon the movement of said annular member in the direction in which it is moved by the predetermined opening movement of the main valve; whereby the atmosphere valve is moved to closed position upon said opening movement of the main valve, the means on the annular element for locking the valve open being adapted to lock it closed upon return of said annular element to initial position while said atmosphere valve is closed; whereby upon such initial opening of the main valve and subsequent return of the annular element the atmospheric pressure chamber becomes exposed to the system pressure in excess of atmosphere for forcing to the alarm valve water entering said chamber upon such opening of the main valve.

11. In a valve structure for a fire extinguishing sprinkler system, in combination, a main valve body having a main water inlet port and valve seat thereat, a main valve and lever carrying the same having a fulcrum supported within the main valve body, a latch adapted to engage the lever for locking the main valve at seated position, means operated by a predetermined initial opening of the main valve for disengaging the latch comprising an abutment projecting from the main valve body for encountering the latch in said predetermined initial opening movement of the valve, the main valve body having a hand hole and an exteriorly operable closure for the same, the abutment being carried by said closure in position to be withdrawn from latch encountering position in the opening movement of the closure.

In testimony whereof, I have hereunto set my hand at Chicago, Illinois, this 5th day of October, 1927.

EMIL TYDEN.